March 18, 1969     R. A. PHILLIPS     3,434,036
STARTING CIRCUIT FOR MAGNETIC CORE VOLTAGE INVERTER SYSTEMS
Original Filed Feb. 2, 1967
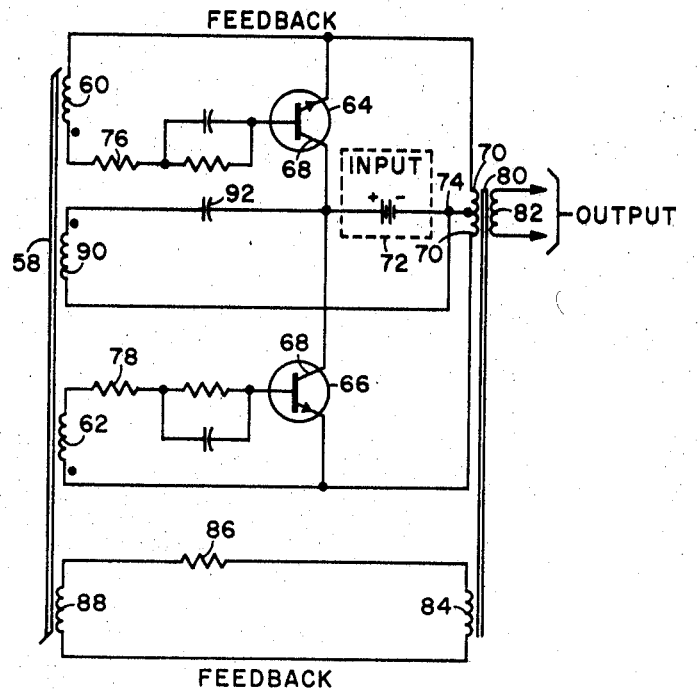
INVENTOR.
ROBERT A. PHILLIPS
BY
ATTORNEYS

3,434,036
STARTING CIRCUIT FOR MAGNETIC CORE VOLTAGE INVERTER SYSTEMS

Robert A. Phillips, Scottsdale, Ariz., assignor to Motorola, Inc., Franklin Park, Ill., a corporation of Illinois
Original application Feb. 2, 1967, Ser. No. 613,564. Divided and this application May 1, 1968, Ser. No. 725,596
U.S. Cl. 321—45      3 Claims
Int. Cl. H02m 7/52; H03k 3/26

ABSTRACT OF THE DISCLOSURE

A starting circuit for a two-transformer transistorized inverter circuit which does not load the power supply during inverter operation. A capacitor is connected between the common collecors to an auxiliary winding on a saturable core transformer which is operative to initiate conduction of one transistor before the other. The polarity of the winding determines which transistor starts conducting current first.

Related application

This application is a divisional application of my patent application Ser. No. 613,564 filed Feb. 2, 1967.

Background of the invention

This invention relates to starting circuits for semiconductor voltage inverter circuits, and particularly to starter circuits for inverter circuits utilizing two cores including feedback between the cores and transstors.

Voltage inverters are widely used to convert from DC to AC. Such inverter circuits are characterized by recurrent switching of current conduction states of various components and alternately saturating magnetic transformers between their opposite magnetic polarities or states. Such circuits include feedback means for sustaining such recurrent switching or oscillations and which may either be related to the current amplitude output or the voltage amplitude ouput. Such arrangements are well known.

Various forms of inverter circuits have different operating and starting characteristics. It is often desired that such inverters start out in the same manner every time they are operated. That is, a particular transistor will always be the first one to conduct a current while a second transistor is always the first one in a current nonconductive state. Usually such inverters will start oscillations with one transistor conducting rather than the other depending on the particular circuit and device characteristics which will vary from one circuit to the next. Also, when the start circuit remains operative after the inverter is operating certain inefficiencies are introduced into inverter operation.

Summary of the invention

Therefore, it is an object of this present invention to provide a voltage inverter circuit which has positive starting capabilities under most load conditions.

It is another object of this invention to provide an automatic starting circuit in a voltage inverter circuit which is automatically effectively decoupled from the inverter circuit during normal operation of such inverter.

It is a further object of this invention to provide a starter portion of a voltage inverter circuit which operates independently of variations in circuit components, impedances, etc.

According to this invention, a very high reactive impedance, such as a small capacitance, such as a small capacitance capacitor, is connected across the inverter initiating power supply to a winding on a saturable core transformer. The transient introduced into the saturable core transformer winding induces a voltage across the control electrodes of one of the transistors to initiate current conduction and inverter operation.

The drawing

The figure shows an illustrative embodiment of the present invention having a voltage-feedback type inverter with an auxiliary winding on a saturable core for coupling the current pulse to the base drive circuit for starting the inverter circuit.

Detailed description of the illustrative embodiment

Referring now to the drawing, there is shown a voltage inverter utilizing voltage feedback; that is, the feedback drive to the transistor switches is proportional to the output voltage amplitude. This circuit includes a saturable core 58 having windings 60 and 62 respectively connected across the base-emitter portions of transistors 64 and 66. Transistor switch collector electrodes 68 are connected together and to the positive end of battery 72. Battery 72 has its negative terminal connected to tap 74 of winding 70. Each of the transistors has a base input circuit 76 and 78 respectively connecting the base electrode to the windings 60 and 62. Winding 70 is wound on a linear transformer core 80 which also has output winding 82 wound thereon.

The inverter circuit is completed by the voltage feedback loop including winding 84 on transformer core 80, limiting resistor 86 and winding 88 on saturable transformer core 58. When the circuit is operating, i.e., recurrent switching conduction between transistor 64 and 66, the resultant output signal in winding 70 induces a signal in winding 84. Such induced signal is transferred through the loop to winding 88, thence through core 58, back to windings 60 and 62 for providing base drive to transistors 64 and 66 to sustain the oscillations.

The improvement provided by this invention in the just described circuit includes the provision of additional winding 90 on core 58. Winding 90 is connected across input source 72 through capacitor 92. It is to be appreciated that when the circuit is operating with battery 72 connected as shown, capacitor 92 will be fully charged thereby blocking any currents, except for reactive non-power consuming voltage changes, or signals induced in winding 90, therefore, for all practical purposes effectively disconnecting capacitor 92 and winding 90 from the inverter circuit. However, when battery 72 is first connected to the circuit, a positive voltage is supplied to capacitor 92 which causes a transient signal to be provided to winding 90, which in turn is transferred through windings 60 and 62 to the base drive circuits of transistors 64 and 66. Both windings 60 and 62 are polarized in the same direction, therefore, a positive signal may be induced in winding 60 and passed through base circuit 76 to first turn on transistor 64 to current conduction. In a similar manner, a negative voltage is passed by winding 62 through base drive circuit 78 to provide a current cutoff drive to transistor 66. In this manner transistor 64 will always start conducting first whenever the voltage inverter circuit is initially started.

The operation of the circuit after starting is generally known. In summary first assume that transistor 64 is conducting current, and transistor 66 is nonconductive. As transistor 64 conducts current, core 58 becomes saturated due to the action of winding 88, which in turn results in a decrease of output signal amplitude in winding 82. At maximum current conduction through transistor 64, transistor 66 is driven further into current nonconduction. However, when magnetic saturation is reached in core 58, the base drive to transistor 64 is reduced. This action permits the magnetic field of core 58 to collapse inducing base drive voltage in winding 62 for transistor 66. This drive voltage in turn is amplified through the transistor into windings 70, 84 thence 88 which further drives the magnetic core 58 toward opposing magnetic saturation. The whole circuit is regenerative and quickly transistor 64 stops conducting while transistor 66 begins conducting. When transistor 66 reaches full conduction and its current amplitude is the greatest, the above-described operation is repeated. In this manner the inverter circuit oscillates to provide an alternating voltage output through winding 82. It is usual, when a DC voltage is desired, to place a rectifier and a filter (not shown) across winding 32.

I claim:
1. A voltage inverter circuit having a substantially non-loading starting circuit portion, including in combination,
a first transformer having a saturable magnetic core with first and second inverter operating windings each having first and second free ends, third and fourth winding on said saturable core each having first and second free ends,
first and second transistors each having base, first and second electrodes with said second electrodes being joined together,
a second transformer having a linear magnetic core with an output winding and a center tapped input winding having two free ends and a center tap connection,
said first electrodes of said first and second transistors being respectively connected to the free ends of said center tapped winding of said second transformer and respectively to said second free ends of said first and second windings on said first transformer,
said first free ends of said first and second windings being respectively connected to said base electrodes of said first and second transistors,
DC input means connected between said second electrodes and said center tap of said second transformer,
a capacitor connected between said second electrodes and a first free end of said third winding on said first transformer, said second end of said third winding being connected to said center tap of said second transformer,
and an additional winding on said second transformer connected across said fourth winding of said first transformer and a resistor electrically interposed between said additional and fourth windings.

2. The circuit of claim 1 further including resistive-capacitive circuit means electrically interposed between each base electrode and the respective first free ends of said inverter operating windings.

3. The circuit of claim 2 wherein said first electrodes are emitters and said second electrodes are collectors.

References Cited

UNITED STATES PATENTS

| 2,783,384 | 2/1957 | Bright et al. | 331—113 |
| 2,916,704 | 12/1959 | Morey | 331—113 |
| 2,950,446 | 8/1960 | Humez et al. | 331—114 |
| 3,172,060 | 3/1965 | Jensen | 331—113 |
| 3,308,397 | 3/1967 | Morgan | 311—113 |
| 3,344,362 | 9/1967 | Lingle | 331—113 |

JOHN F. COUCH, *Primary Examiner.*

W. SHOOP, *Assistant Examiner.*

U.S. Cl. X.R.

331—113